United States Patent [19]
Rasmussen

[11] Patent Number: 5,620,713
[45] Date of Patent: Apr. 15, 1997

[54] EXTRUSION DIE FOR DOUGH

[75] Inventor: Glenn O. Rasmussen, Champlin, Minn.

[73] Assignee: The Pillsbury Company, Minneapolis, Minn.

[21] Appl. No.: 469,221

[22] Filed: Jun. 6, 1995

[51] Int. Cl.$^6$ ................................................. B29C 47/06
[52] U.S. Cl. ........................ 425/131.1; 425/133.1; 425/382.4; 425/462; 425/467; 426/516
[58] Field of Search ......................... 425/131.1, 133.1, 425/382.4, 462, 467; 426/516

[56] References Cited

U.S. PATENT DOCUMENTS

| | | | |
|---|---|---|---|
| 2,018,751 | 10/1935 | Vogt | 107/8 |
| 2,106,009 | 1/1938 | Lee | 107/19 |
| 2,122,982 | 7/1938 | Leo | 99/132 |
| 2,794,746 | 6/1957 | Schwartz | 99/115 |
| 2,816,837 | 12/1957 | Holsman | 99/171 |
| 3,018,182 | 1/1962 | Leach | 99/134 |
| 3,228,256 | 1/1966 | Schafer | 107/1 |
| 3,314,381 | 4/1967 | Friest et al. | 107/1 |
| 3,727,308 | 4/1973 | Ross | 426/516 |
| 3,760,979 | 9/1973 | Seu | 222/330 |
| 3,884,605 | 5/1975 | Grelon | 425/131.1 |
| 4,260,640 | 4/1981 | Hartmann et al. | 426/516 |
| 4,340,994 | 7/1982 | do Santos et al. | 17/45 |
| 4,460,611 | 7/1984 | Suzuki | 426/272 |
| 4,507,326 | 3/1985 | Tarantino | 426/101 |
| 4,643,084 | 2/1987 | Gomez | 99/352 |
| 4,647,467 | 3/1987 | Pinto | 425/131.1 |
| 4,648,821 | 3/1987 | Thulin | 426/516 |
| 4,783,290 | 11/1988 | Simelunas | 425/133.1 |
| 4,954,061 | 9/1990 | Repholz et al. | 425/133.1 |
| 5,120,554 | 6/1992 | Farnsworth et al. | 426/516 |
| 5,146,844 | 9/1992 | Dubowik et al. | 99/45.6 |
| 5,208,059 | 5/1993 | Dubowik et al. | 426/512 |
| 5,223,276 | 6/1993 | Djordjevic et al. | 425/382.4 |
| 5,304,055 | 4/1994 | Van Lengerich et al. | 426/516 |

FOREIGN PATENT DOCUMENTS

| | | |
|---|---|---|
| 847.554 | 10/1939 | France . |
| WO92/21506 | 12/1992 | WIPO . |
| WO95/31108 | 11/1995 | WIPO . |

OTHER PUBLICATIONS

Brochure, "Formpress Installations", Hutt Bepex GmBh, pp. 1–4 and 15–22.

Primary Examiner—Khanh P. Nguyen
Attorney, Agent, or Firm—Westman, Champlin & Kelly, P.A.

[57] ABSTRACT

A dough extrusion die has a die set with an inner die and an outer die. The inner die is formed in a desired shape that represents an item of interest, such as an animal, toy, or other identifiable object, and the outer die has an opening surrounding the inner die. Dough is extruded through each of the dies simultaneously. The dough for the inner die has a different indicia, such as color or other visually identifiable characteristic from the dough extruded through the outer die. A sizing housing is positioned downstream from the dies and smoothly changes in cross sectional size in direction away from the dies to permit the dough to flow such that streamlines remain parallel as the sizing housing changes in size, to accurately retain the center cross sectional shape of the extruded dough as formed by the inner die. Preferably, as disclosed, the sizing housing is cone shaped to reduce the extruded dough cross sectional area.

17 Claims, 3 Drawing Sheets

EXTRUSION DIE FOR DOUGH

BACKGROUND OF THE INVENTION

The present invention relates to a die for coextrusion of two doughs into a dough log with a cross section that includes a complex center shape, such as of an animal, made from a first identifiable dough, surrounded by a second dough to form the dough log. The dough is extruded through dies and then moves into a sizing housing that changes smoothly in cross section from a constant size chamber to the outlet opening to maintain a sharp definition of the center cross section dough relative to the outer dough.

In the prior art, two food materials such as cookie dough have been extruded simultaneously, to form an interior core of a selected shape. Machines for coextrusion are made by Rheon Automatic Machinory Co., Ltd., Utsonomiya Japan and by Bepex GMBH of Leingarten, Germany. Both companies have coextrusion die heads that are suitable for certain applications, including making candy, and also for forming cookie dough, but the dies used do not provide satisfactory definition between the interior cross sectional shape and the outer surrounding material, such as a cookie dough, when the dough is extruded through the dies. As the shape of the internal cross section is made intricate the definition drops significantly.

The Rheon extruder has dies that control flow by restricting the flow passages to small holes and slots, and the flow is shaped by filling a cavity of the desired center cross sectional shape with a first dough around which an outer dough is extruded. This system has limitations as to its capacity because of the size of the restriction holes in the die. In high production of cookie doughs for example, the small holes are not economical.

The Bepex extruder uses an open die that is designed to account for flow expansion of the dough after passing through the die, and a housing cavity forms the center shape downstream of the die opening. The dies are developed by trial and error and are dependent on the rheology of the dough remaining constant to work reliably. In extruding large quantities of cookie dough, the flow properties of the dough cannot be controlled sufficiently accurately to insure maintaining sharp definition between the center cross section dough and the outer surrounding dough. Relatively sharp corners and small fillets will lose definition. Thus, a problem remains with the use of dies that have adequate flow properties, because they do not provide the desired product shape definition in the extruded dough log.

SUMMARY OF THE INVENTION

The present invention relates to a die for simultaneously extruding two different, identifiable doughs through a pair of concentric dies, one being an inner die and the other an outer die. The two dough mixes have different identifiable indicia, such as different color characteristics or texture characteristics so that the shape of the dough cross section extruded through the inner die is maintained in the final extruded dough log. The dies are made large enough to permit the exterior configuration of the center dough to be fairly intricate, while maintaining a high flow rate of the extruded doughs. After the dough passes through the dies and the outer dough is shaped in a chamber, the extruded dough is then sized by moving the material through a smoothly changing cross section sizing chamber in a sizing housing, while maintaining a laminar flow regime. Laminar flow and the changing dimension sizing housing insure that the shape of the pattern in the dough formed by the inner die will remain in the same shape and size proportion to the total dough flow. Preferably, the sizing chamber reduces in cross section in direction toward the outlet.

As long as laminar flow is maintained, the extruded dough moves along parallel streamlines that remain oriented relative to each other, so the cross sectional shape of the inner dough will retain its shape.

Thus, co-extruded doughs having an internal or center portion dough that is of a desired cross sectional shape encased by a second dough, can be made with the center portion cross section formed into complex, sharply defined representations.

DETAILED DESCRIPTION OF THE PREFERRED EMBODIMENTS

Figure 1:
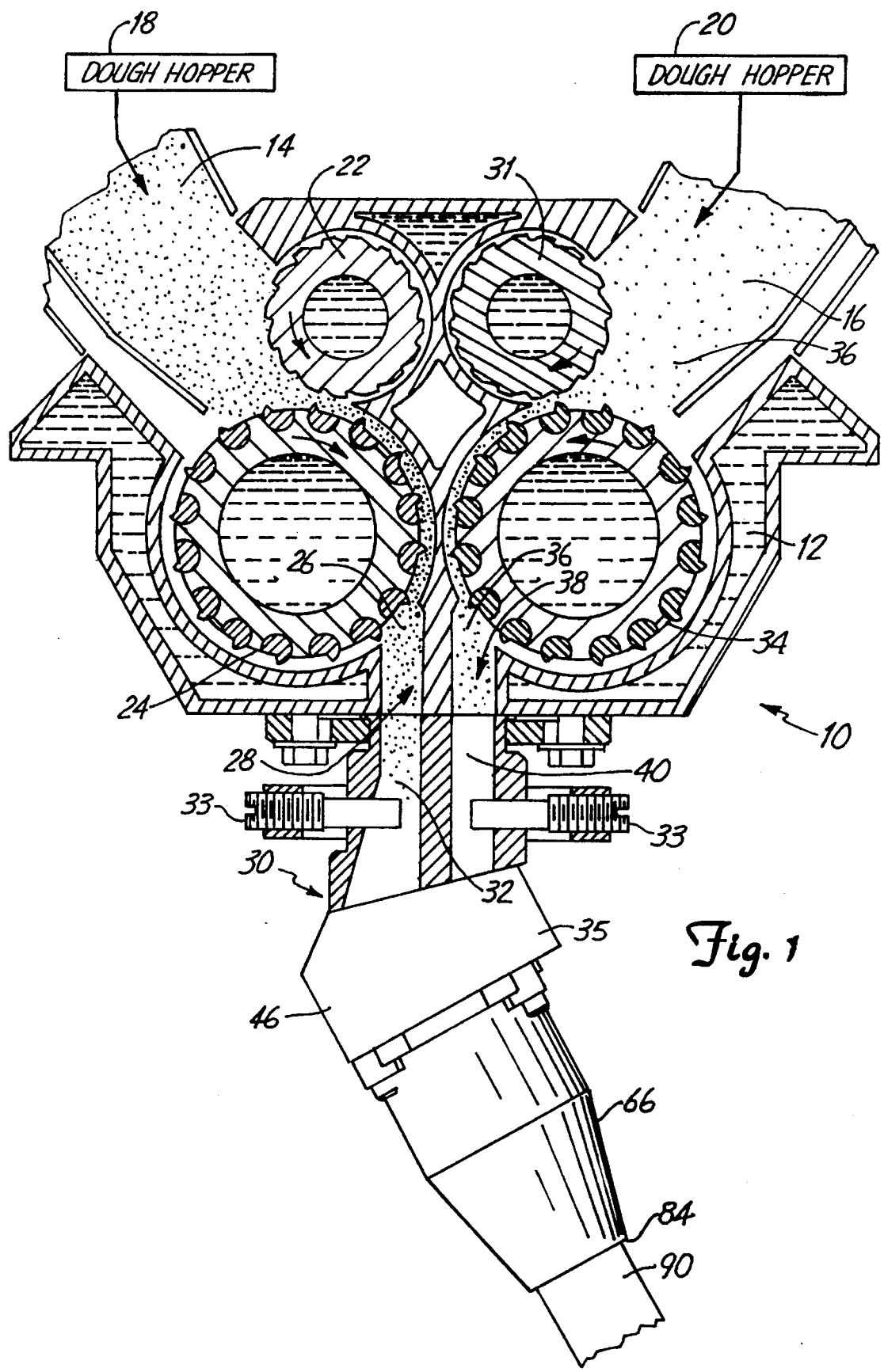
FIG. 1 is a schematic cross sectional representation of the typical extruder that can be used with the extrusion die of the present invention.

A dough extruder indicated generally at 10 is of conventional design, for example of the type sold by Bepex GMBH of Leingarten, Germany, and includes extruder body 12 having first and second inlets 14 and 16, respectively that are connected to suitable dough hoppers 18 and 20 which are shown only schematically. The extruder body 12 includes a separate pair of extruder rolls 22 and 24 that are rotated under power as illustrated by arrows to feed a first dough 26 through an extruder outlet passageway 28 into an inlet opening or passageway 32 of a die block assembly 30. The inlet passageway 32 leads to forming die for the first dough 26.

A second set of extruder rolls 31 and 34 are powered to rotate and feed a second dough 36 from the hopper 20 into and through an outlet passageway 38 of the extruder head 12 in through a second inlet passageway 40 of the die block assembly 30 receiving the second dough 36. The operation of the extruders, and feeders between the hoppers and the extruder and other factors, such as the consistency of the dough, are selected by operators and are within the knowledge of workers in the field. The details of operation of the extruder rolls are also well known so the showing of the extruder is schematic. The dough feed rates can be adjusted with adjustment screws 33 so that one set of the extruder rolls will feed a larger volume of the respective dough than the other, so that the final product that is being formed in dies of the die assembly will be shaped and made up of the desired proportion of the two doughs used. The outer dough is fed in larger volume than the inner dough. Dough dividers and guides are also used, as conventionally, to direct the dough to fill cavities in a die holder 35. The extruders are operated preferably to maintain laminar flow. Also, usually more than one die holder 3S is attached to each extruder, but one die holder is illustrated.

Figure 2:
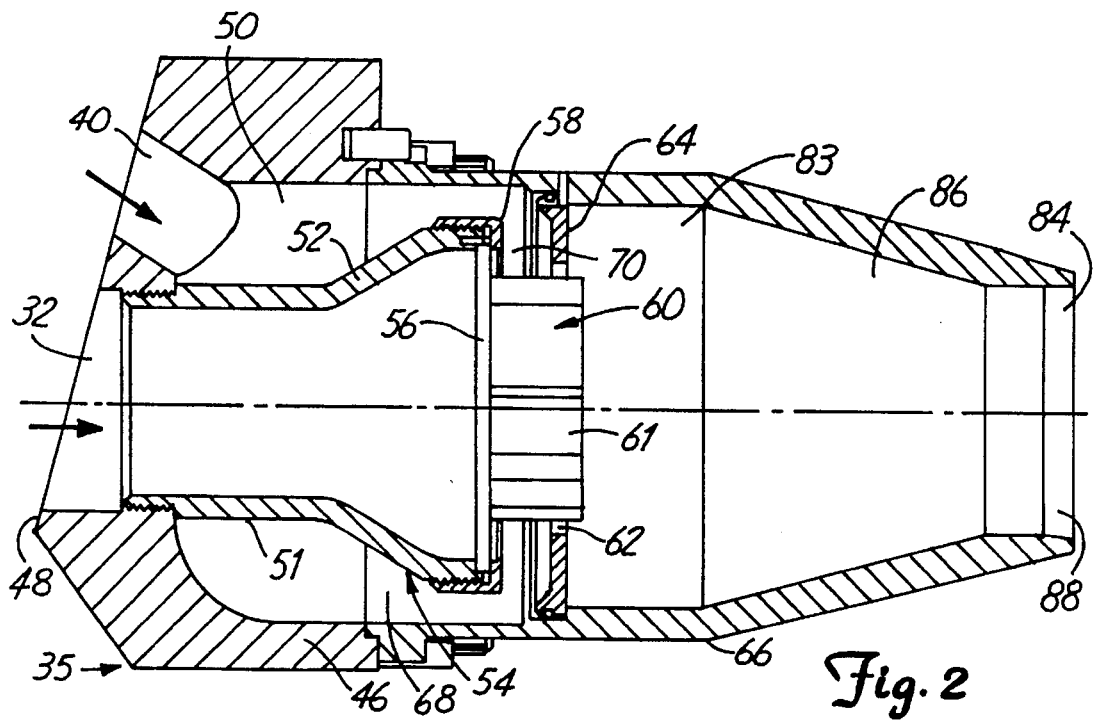
FIG. 2 is a longitudinal sectional view of an extruder die head having inner and outer dies made according to the present invention.
Figure 3:
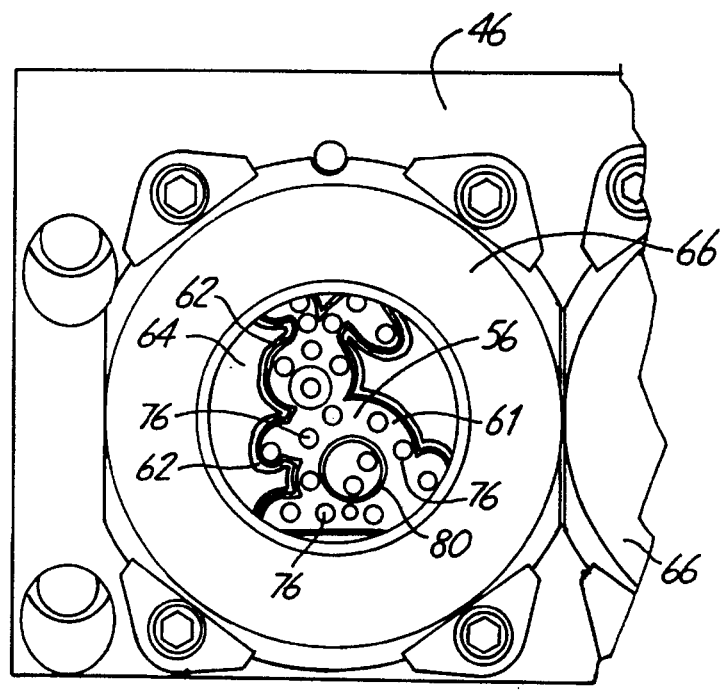
FIG. 3 is a schematic view of the die.

Referring to FIGS. 2 and 3, the die holder 35 includes an outer housing 46 that has a wall 48 that seals against the extruder housing 12 in a conventional manner. The inlet opening 32 aligns with the outlet passageway 28 of the extruder, and the inlet opening 40 aligns with the outlet passageway 38. The die holder 35 is held in place in a suitable manner, as required for sanitary applications for handling various products, such as cookie dough, in the present device. The inner die assembly 54 includes a feed chute 51 that is on the interior of an outer dough chamber 50. The feed chute 51 is sealed from chamber 50. As shown the feed chute 51 expands in a downstream direction at a throat portion 52. The feed chute 51 has external threads which are used for holding the inner die assembly 54 in place in housing 46.

Figure 4:
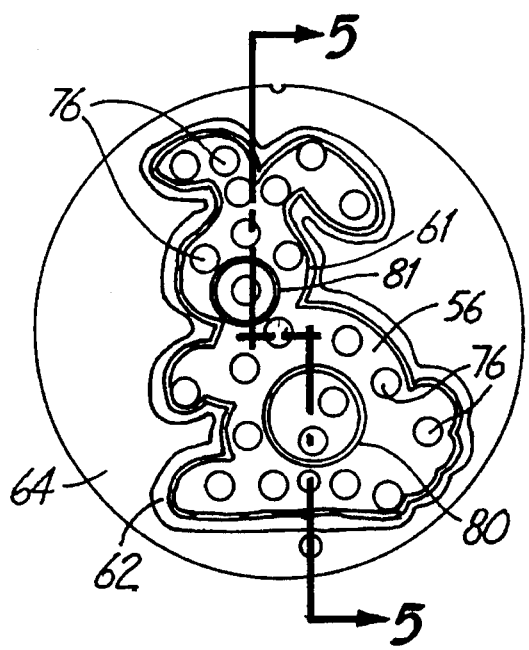
FIG. 4 is a schematic representation of a die used with the present invention.
Figure 5:
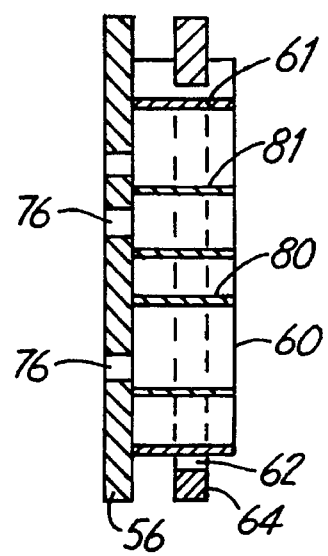
FIG. 5 is a sectional view of the die taken on line 5—5 in FIG. 4.

The inner die assembly 54 includes a die plate 56 that is clamped against an end surface of the expanding throat section 52 of the feed chute 51 with a suitable threaded ring 58. The die plate 54 has a cross sectional dough shape forming housing 60 fixed on an outlet side. The shape forming housing 60 has a relatively thin, continuous peripheral wall 61 that defines the center cross sectional shape as shown in FIG. 4. The axial length of the wall 61 is selected to provide for adequate forming of the cross section.

The inner die housing 60 extends through an opening 62 of an outer die plate 64 has an opening that has a peripheral edge surface follows the outer contours of the wall 61 of die housing 60 and is spaced from the outer surface of the wall 61 to form an opening or passage 62. The edges of opening or passage 62 conform to the center cross sectional shape formed by wall 61. The outer die plate 64 is held in position with suitable snap rings against a shoulder or other members in a conventional manner inside a dough log sizing housing 66. The log sizing housing 66 in turn is mounted onto the housing 46 in a conventional manner. The outer dough chamber 50 is of sufficient size so that there is a passageway 68 that surrounds the feed chute 51 and the clamp ring 58. The outer die plate 64 is spaced axially (downstream) from the ring 58 to provide a dough passage 70 so that the outer dough 36 can flow from the extruder into inlet 40, through the passageways 68 and 70 and then be extruded out through the die opening 62 that surrounds the wall 61 of center die housing 60.

The center die plate 56, as shown in FIGS. 3 and 4 includes a plurality of holes 76 that are on the interior of the peripheral wall 61 of center die housing 60, and these holes 76, as shown in FIGS. 3 and 4 are positioned and sized so that the first dough 26 that is extruded through the die plate 56 and through holes 76 will fill the interior cross sectional shape of the die wall 61 of center die housing 60. As shown in FIG. 4, where a rabbit shape is shown, the wall 61 defines a number of irregular curves including the ear section, a front paw section, and rear paw sections. The holes 76 are positioned and sized strategically so that as the dough is extruded through the holes it will tend to fill the entire space within the peripheral wall 61 before the dough is moved out of the die housing toward an outlet. Additionally, in large open or unobstructed regions of the cross sectional shape of the wall 61, tubes indicated at 80 and 81 will be provided for receiving the extruded dough from one or more of the holes 76 and while the dough expands to fill the tubes it is confined within the tubes to the exit end. Voids in the extruded cross sectional shape from the inner die are controlled and avoided after the dough exits the outlet end of the inner die.

the outer die plate 64 is positioned near the outlet end of the inner die, but spaced upstream a small amount (⅛ inch or so) so the dough coming through the opening 62 starts to expand as it moves along the inner die wall 61 and then engages the outer surface of dough exiting the inner die, to avoid voids along the junction or interface between the outer surface of the inner dough and the outer dough.

The die opening or orifice indicated at 62 closely follows and is spaced from the outer peripheral surface of the inner or center die wall 61, so that the outer dough is extruded through the opening 62 and moves along wall 61. The outer dough thus is shaped to conform to the periphery of the inner dough and forms a supporting ring that fills in the irregularities in the outer surface of the inner die to encompass and retain the inner dough shape. The outer dough also expands outwardly after it leaves the die plate 64. The dough moves from the die toward an outlet end 84 of the forming and sizing housing 66, and the outer dough first will expand and fill a throat portion of the sizing housing comprising a forming chamber 83 that is constant size throughout its length. The outer dough surrounds the inner dough and the flow characteristics of the dough, the respective feed rates and the extruder pressure all serve to create the filling of the forming chamber 83 immediately "downstream" of the dies.

The interior sizing chamber 86 of the sizing housing 66 changes in cross sectional size smoothly and uniformly for a specific length along the longitudinal axis of the die set. This sizing chamber 86 as shown is cone shaped and preferably reduces in cross section from the junction with forming chamber 83 to an outlet orifice 88, which is the final sizing for an outer diameter of a dough log shown at 90 in FIG. 1. The orifice 88 is a short, uniform cross sectional region.

While the surface defining sizing chamber 86 is shown as converging in direction away from the inner and outer dies, (in downstream direction) the cross section of the sizing chamber could also expand or diverge smoothly in longitudinal downstream direction. A diverging cone sizing chamber will maintain a proportional cross sectional size between the formed center or inner dough and the outer dough, while maintaining the shape of the inner dough.

The dough consistency is within the range normally used for cookie doughs (or other doughs), and the extruder pressures are maintained also in a known range for this type of extrusion with laminar flow. The pressure and feed rate for the two doughs will be independently selected. The outer dough is the larger volume.

Figure 6:
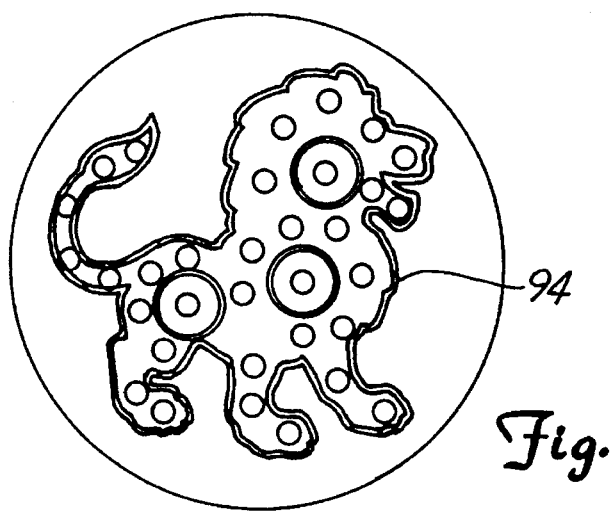
FIG. 6 is a representation of another complex shape that can be extruded with the dies of the present invention.

The inner and outer doughs (cookie doughs) will be provided with visually identifying characteristics such as different colors, or even perhaps texture, and will thus form an interior cross sectional shape of dough that is visible. The shape of an animal shown in FIG. 3 and a lion shape die 94 as shown in FIG. 6, or some other unique shape, such as a jack-o-lantern. Then, when the dough log 90 is sliced and the slices of dough baked, the cookies from the dough log will have a sharply defined internal cross sectional shaped animal or other object.

The flow rates are such that the flow of both of the inner and outer doughs remain laminar as the dough passes into and through the center die, and as both doughs move through the forming and sizing chamber 86 of housing 66. Laminar flow is important in maintaining the sharp cross sectional definition required, in that the streamlines of the laminarly flowing dough remain parallel, or in other words complementary in position to other adjacent streamlines so the space between the streamlines as the dough moves through the forming and sizing housing changes, but the shape and relative position of the streamlines does not change.

When used with a reducing size sizing chamber downstream of the dies, the die shape can be large, to permit the dough to form into more intricate peripheral shapes. Changing the size of the extruded dough log with smoothly decreasing or increasing size cone sizing chamber, maintains the definition of the outer periphery while changing the final size of the dough log. The cross sectional shape of the sizing chamber (circular as shown) preferably remains the same throughout its length but the size changes.

Although the present invention has been described with reference to preferred embodiments, workers skilled in the art will recognize that changes may be made in form and detail without departing from the spirit and scope of the invention.

What is claimed is:

1. In an extruder die assembly for forming an elongated log of extrudable material having a cross sectional configuration including a center portion of a material having a first visually identifiable characteristic, and an outer portion of a material having a second visually identifiable characteristic, the center portion having an identifiable cross sectional configuration of an irregular outer periphery, the improvement comprising a die set for the extruder die assembly having an inner die for forming the center portion and an outer die, a feeder for feeding the material of the first characteristic to the inner die and the material of the second characteristic to the outer die, the inner die having a surface formed into the identifiable cross sectional shape and being positioned within the outer die, and a sizing housing having a sizing chamber including a throat portion surrounding the outer die and the inner die to receive the materials from the die set, the sizing chamber throat portion being defined by a surface larger than and downstream of the inner and outer dies, the throat portion surface being defined parallel to a central axis of the die set so the material passing through the outer die expands into a constant cross sectional area throat portion after exiting the dies and is moved along the constant cross sectional area downstream of the die set, and the sizing chamber surface having a second portion that gradually changes in cross sectional size from the throat portion to an outlet end of the sizing housing downstream of the die set.

2. The extruder die assembly of claim 1, wherein said second portion of the surface defining the sizing housing chamber decreases in cross sectional area between the throat portion and the outlet end of the sizing housing.

3. The extruder die assembly of claim 1 wherein said inner die has a wall with inner and outer surfaces, both of said inner and outer surfaces being configured to the identifiable cross sectional configuration, the outer die having an aperture conformed to the outer surface of the wall of the inner die, and the aperture having an inner surface spaced from the outer surface of the inner die around the periphery of the inner die to form an extrusion passage for the second material.

4. The extruder die assembly of claim 3, wherein said sizing chamber is defined by a conical interior surface at least along a major portion thereof, that reduces in cross sectional area in direction from the inner and outer dies toward the outlet end of the sizing housing.

5. The extruder die assembly of claim 1, wherein said inner die includes a die plate and an inner die housing, the inner die housing having the cross sectional configuration of the center portion of the log, and said die plate having openings through which the material with the first characteristic passes into the inner die housing, said openings being positioned and of size so the first material expands and fills the cross sectional shape of the inner die housing in the throat portion of the sizing chamber after passing through the die plate.

6. The extruder die assembly of claim 1, wherein the feeder included separate extruders for providing a dough of the first characteristic to the inner die, and a dough of the second characteristic to the outer die.

7. The extruder die assembly of claim 6, wherein said inner die comprises an inner die housing, and the outer die includes a passageway surrounding the inner die housing, the material having the other characteristic passing through the aperture to surround the inner die housing.

8. The extruder die assembly of claim 1, wherein said inner die has an identifiable cross sectional shape representing an animal.

9. The extruder die assembly of claim 7, wherein said inner die housing comprises a substantially uniform thickness wall defining the periphery of the identifiable cross sectional shape, and a die plate mounted for controlling extrusion of material into said inner die housing, said die plate having controlled size openings therein positioned such that the material passing through the openings fills the inner die housing before the material exits the inner die housing.

10. The extruder die assembly of claim 1, wherein said material having the first characteristic is a cookie dough material of a first color, and said the material having the second characteristic is a cookie dough having a second color different from the first color.

11. The extruder die assembly of claim 7, wherein said outer die forms material to substantially encase the material extruded from the inner die housing.

12. The extruder die assembly of claim 1, wherein when the volume of material fed through the inner die is in the range of one-half of the volume of material fed through the outer die.

13. A die set for an extruder assembly for extruding dough, said die set including an inner die and an outer die, said extruder providing a first dough to the inner die and a second dough to the outer die for coextrusion, the outer die surrounding at least a housing portion of the inner die, the inner die having an extrusion plate through which the first dough is extruded, and the inner die housing portion having a desired configuration, said outer die including an outer die plate that has an opening surrounding and generally conforming to the outer periphery of the inner die housing and surfaces defining the opening of the outer die being spaced from an outer periphery of the inner die housing to permit material to be extruded between the inner die housing and the surfaces of the opening of the outer die plate, and a sizing housing for receiving material that has been extruded through the inner and outer dies, said sizing housing having a first surface portion of substantially uniform cross sectional size extending downstream from both the inner die and the outer die, dough exiting the outer die plate filling in around and surrounding the dough exiting the inner die, and a second surface portion that changes in cross sectional area at a substantially uniform rate from adjacent the first portion and downstream of the die set toward an outlet, to change the cross sectional size of the two doughs extruded from the die set and through the first surface portion.

14. The die set of claim 13, wherein the sizing housing reduces in cross sectional size from the first surface portion toward the outlet.

15. The die set of claim 13, wherein the cross sectional shape of the sizing housing in the first surface portion is cylindrical and remains substantially the same shape throughout the length of both the first and second surface portions.

16. The die set of claim 13, wherein the inner die housing extends downstream from the outer die a distance to permit the material extruded from the outer die to fill the space around the inner die and the first surface portion, the first surface portion extending downstream of both the first and second dies.

17. The die set of claim 16 and extruder drives and feeds for each of the first and second doughs to provide a flow rate to each dough so as to maintain laminar flow of the second dough through the inner die housing and the first portion of the sizing housing and of both doughs, as the doughs are moved through the second portion of the sizing housing.

* * * * *